(12) United States Patent
Palanki et al.

(10) Patent No.: US 8,886,113 B2
(45) Date of Patent: Nov. 11, 2014

(54) CENTRALIZED CONTROL OF RELAY OPERATION

(75) Inventors: Ravi Palanki, San Diego, CA (US); Naga Bhushan, San Diego, CA (US); Avneesh Agrawal, San Diego, CA (US); Aamod D. Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 12/643,853

(22) Filed: Dec. 21, 2009

(65) Prior Publication Data

US 2010/0167743 A1 Jul. 1, 2010

Related U.S. Application Data

(60) Provisional application No. 61/141,633, filed on Dec. 30, 2008.

(51) Int. Cl.
| | |
|---|---|
| *H04B 7/15* | (2006.01) |
| *H04B 7/26* | (2006.01) |
| *H04B 7/155* | (2006.01) |
| *H04W 72/02* | (2009.01) |
| *H04W 92/18* | (2009.01) |
| *H04W 72/08* | (2009.01) |
| *H04W 88/04* | (2009.01) |

(52) U.S. Cl.
CPC .............. *H04B 7/155* (2013.01); *H04W 92/18* (2013.01); *H04B 7/2606* (2013.01); *H04W 72/085* (2013.01); *H04W 88/04* (2013.01); *H04W 72/02* (2013.01)
USPC ............................ 455/11.1; 455/13.1; 455/16

(58) Field of Classification Search
CPC ...... H04B 7/026; H04B 7/14; H04B 7/15507; H04B 7/15592; H04B 7/2606; H04B 7/155; H04W 40/22; H04W 88/04; H04W 52/46; H04W 72/02; H04W 92/18
USPC ................ 455/3.02, 427, 428, 430, 431, 7–9, 455/11.1, 12.1, 13.1, 13.2, 14–17; 340/425.1; 370/226, 293, 246, 274, 370/279, 315, 316, 492, 501; 375/211
See application file for complete search history.

(56) References Cited

U.S. PATENT DOCUMENTS

| 6,993,001 | B1 * | 1/2006 | Polan et al. | 370/335 |
|---|---|---|---|---|
| 7,355,993 | B2 * | 4/2008 | Adkins et al. | 370/318 |

(Continued)

FOREIGN PATENT DOCUMENTS

| EP | 1744502 A1 | 1/2007 |
|---|---|---|
| EP | 1863199 A1 | 12/2007 |

OTHER PUBLICATIONS

International Search Report & Written Opinion—PCT/US2009/069497, International Search Authority—European Patent Office—Feb. 19, 2010.

(Continued)

*Primary Examiner* — Dominic E Rego

(57) ABSTRACT

Techniques for centralized control of relay operation are described. In an aspect, a designated network entity (e.g., a base station or a network controller) may control the operation of relay stations within its coverage area. The network entity may select certain user equipments (UEs) to be relay UEs that can serve as relay stations for other UEs, e.g., based on pathloss between the UEs and a base station, the locations of the UEs, battery power levels of the UEs, fairness considerations, etc. The network entity may also select a specific relay UE to serve as a relay station for a client UE desiring to communicate with a base station, e.g., based on pilot measurements from relay UEs for the client UE. The network entity may also control transmission of discovery pilots by relay UEs and/or client UEs for relay detection.

22 Claims, 8 Drawing Sheets

(56) References Cited

U.S. PATENT DOCUMENTS

| | | | |
|---|---|---|---|
| 7,363,003 B2* | 4/2008 | Takatani et al. | 455/13.1 |
| 7,463,673 B2* | 12/2008 | Fujii et al. | 375/211 |
| 7,848,774 B2* | 12/2010 | Park | 455/550.1 |
| 7,889,699 B2* | 2/2011 | Suh et al. | 370/331 |
| 7,929,963 B2* | 4/2011 | Cho et al. | 455/424 |
| 2003/0124976 A1* | 7/2003 | Tamaki et al. | 455/15 |
| 2004/0192204 A1* | 9/2004 | Periyalwar et al. | 455/25 |
| 2004/0266339 A1* | 12/2004 | Larsson | 455/7 |
| 2005/0014464 A1* | 1/2005 | Larsson | 455/11.1 |
| 2005/0148315 A1* | 7/2005 | Sawada | 455/403 |
| 2006/0084438 A1* | 4/2006 | Kwon | 455/436 |
| 2007/0015461 A1* | 1/2007 | Park et al. | 455/13.1 |
| 2007/0104127 A1* | 5/2007 | Suh et al. | 370/328 |
| 2007/0160014 A1 | 7/2007 | Larsson | |
| 2007/0202803 A1* | 8/2007 | Miyoshi | 455/11.1 |
| 2007/0280172 A1 | 12/2007 | Tan et al. | |
| 2008/0013459 A1* | 1/2008 | Do et al. | 370/248 |
| 2008/0049678 A1* | 2/2008 | Chindapol et al. | 370/331 |
| 2008/0051147 A1* | 2/2008 | Kwun et al. | 455/561 |
| 2008/0056199 A1* | 3/2008 | Park et al. | 370/332 |
| 2008/0057864 A1* | 3/2008 | Jung et al. | 455/18 |
| 2008/0057973 A1* | 3/2008 | Park | 455/452.2 |
| 2008/0068979 A1* | 3/2008 | Visotsky et al. | 370/208 |
| 2008/0188226 A1* | 8/2008 | Tsai et al. | 455/443 |
| 2008/0192686 A1* | 8/2008 | Cho et al. | 370/329 |
| 2008/0227386 A1* | 9/2008 | Dayal et al. | 455/7 |
| 2008/0232296 A1* | 9/2008 | Shin et al. | 370/315 |
| 2009/0016259 A1* | 1/2009 | Zhang et al. | 370/315 |
| 2009/0073915 A1* | 3/2009 | Zhang et al. | 370/315 |
| 2009/0073916 A1* | 3/2009 | Zhang et al. | 370/315 |
| 2009/0227202 A1* | 9/2009 | Doppler et al. | 455/11.1 |
| 2009/0233544 A1* | 9/2009 | Oyman et al. | 455/7 |
| 2010/0103858 A1* | 4/2010 | Palanki et al. | 370/315 |
| 2010/0110284 A1* | 5/2010 | Schack et al. | 348/374 |
| 2010/0136528 A1* | 6/2010 | St-Arnaud | 435/6 |
| 2010/0172284 A1* | 7/2010 | Horiuchi et al. | 370/315 |
| 2010/0296475 A1* | 11/2010 | Visotsky et al. | 370/329 |
| 2011/0136528 A1 | 6/2011 | Sugawara et al. | |
| 2011/0151773 A1* | 6/2011 | Okuda | 455/9 |
| 2011/0222428 A1* | 9/2011 | Charbit et al. | 370/252 |
| 2011/0244788 A1* | 10/2011 | Ode et al. | 455/7 |
| 2011/0306291 A1* | 12/2011 | Ma et al. | 455/9 |
| 2012/0002589 A1* | 1/2012 | Saifullah et al. | 370/315 |
| 2012/0307753 A1* | 12/2012 | Kroth et al. | 370/329 |

OTHER PUBLICATIONS

3G TR 25.924 v1.0.0 (Dec. 1999), 3rd Generation Partnership Project; Technical Specification Group Radio Access Network; Opportunity Driven Multiple Access (3G TR 25.924 version 1.0.0).
Taiwan Search Report—TW098145365—TIPO—Jan. 2, 2013.

* cited by examiner

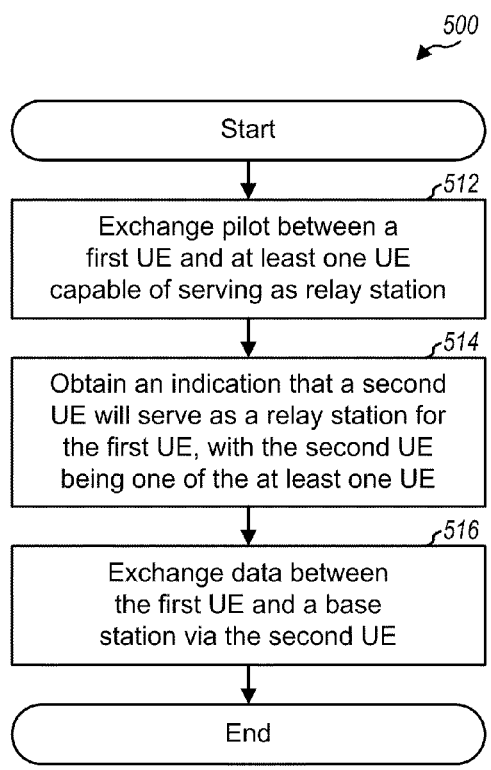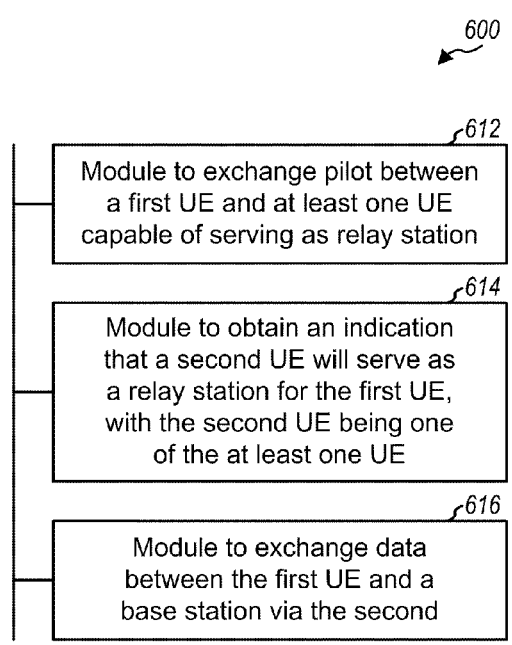
FIG. 5
FIG. 6

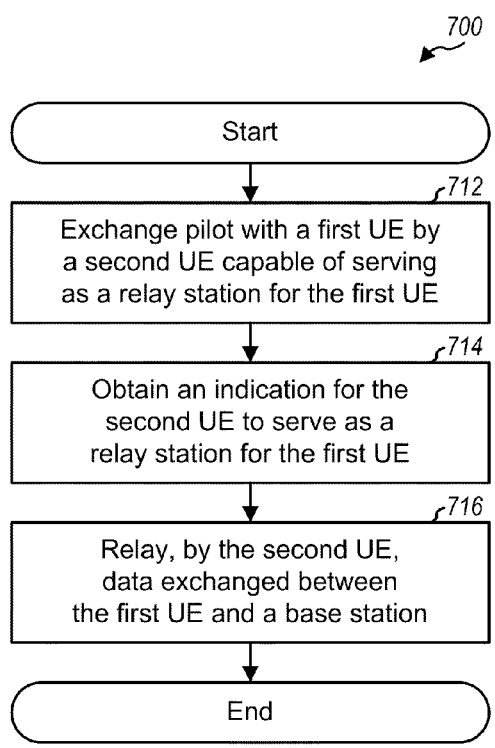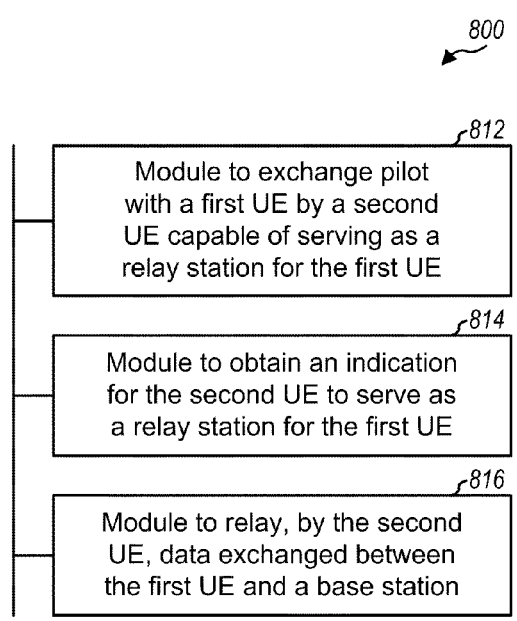
FIG. 7
FIG. 8

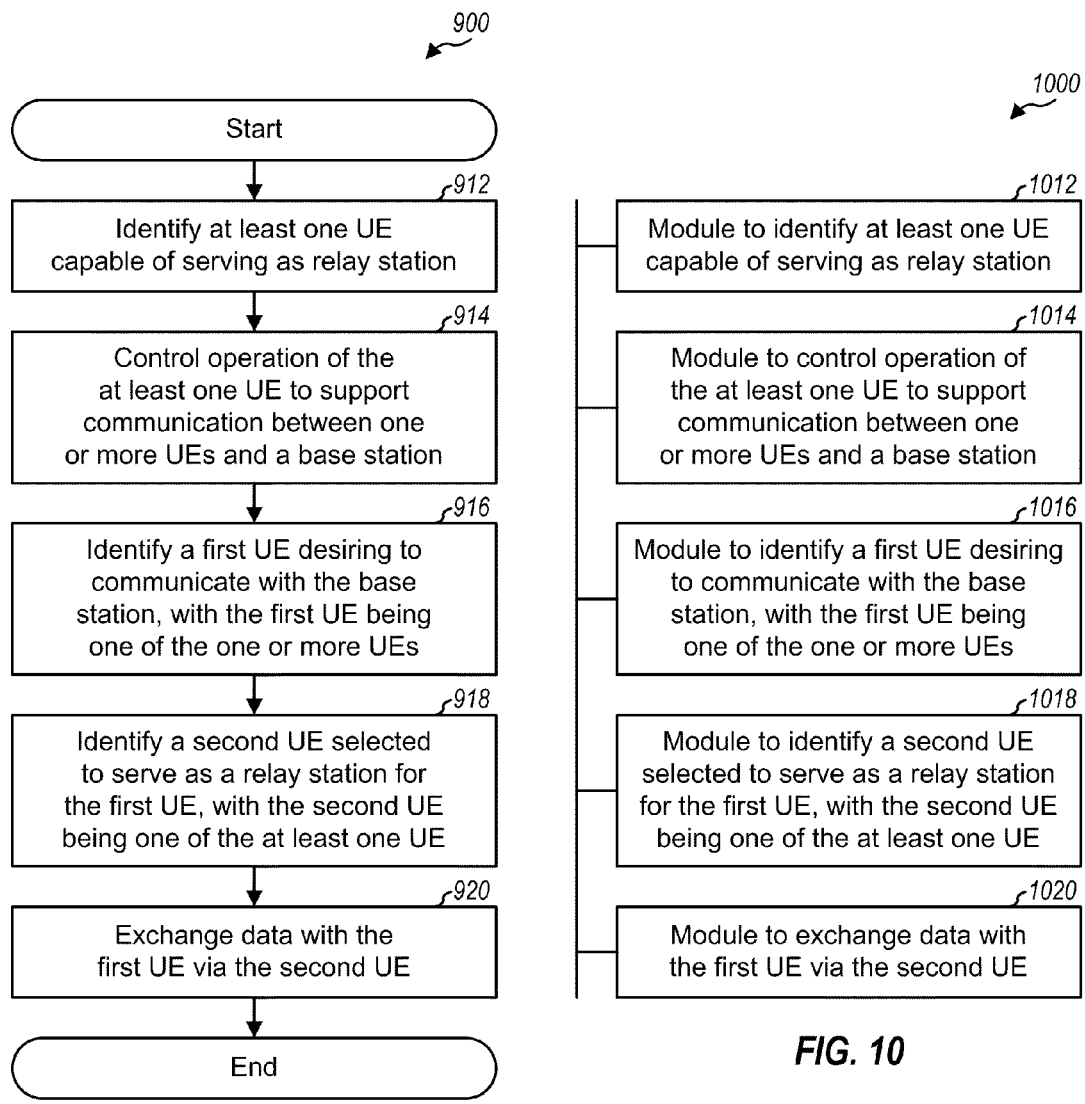

CENTRALIZED CONTROL OF RELAY OPERATION

The present application claims priority to provisional U.S. Application Ser. No. 61/141,633, entitled "USER EQUIPMENT PROXIMITY DETECTION FOR RELAY OPERATION," filed Dec. 30, 2008, assigned to the assignee hereof and incorporated herein by reference.

BACKGROUND

I. Field

The present disclosure relates generally to communication, and more specifically to techniques for supporting communication in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The UE may communicate directly with the base station if a communication channel between the UE and the base station has acceptable quality. The UE may also communicate indirectly with the base station via a relay station if the communication channel between the UE and the base station has poor quality. It may be desirable to control communication of the UE via the relay station such that good performance can be achieved for both the UE and the network.

SUMMARY

Techniques for centralized control of relay operation are described herein. In an aspect, a designated network entity (e.g., a base station or a network controller) may control the operation of relay stations within its coverage area. The network entity may select certain UEs to be relay UEs, which are UEs that can serve as relay stations for other UEs. This selection may be based on pathloss between the relay UEs and a base station, the locations of the relay UEs, battery power levels of the relay UEs, fairness considerations, etc. The network entity may also select a specific relay UE to serve as a relay station for a client UE, which is a UE desiring to communicate with a base station but may be outside of the base station coverage. The network entity may also control transmission of discovery pilots by relay UEs and/or client UEs for relay detection.

In one design, a client UE may desire to communicate with a base station and may exchange pilot with (e.g., transmit pilot to and/or receive pilot from) at least one relay UE. The client UE may obtain an indication that a particular relay UE will serve as a relay station for the client UE. The client UE may then exchange data with the particular relay UE for communication between the client UE and the base station. In one design, the particular relay UE may exchange pilot with the client UE, obtain an indication to serve as a relay station for the client UE, and thereafter relay data exchanged between the client UE and the base station.

In one design, a network entity (e.g., a base station) may control operation of at least one relay UE to support communication between one or more client UEs and a base station. The network entity may select the at least one relay UE to serve as relay station for any client UE within a given coverage area or for a specific client UE. The network entity may control the operation of the at least one relay UE in various manners. The network entity may identify a client UE and may direct the at least one relay UE to detect for pilot from the client UE and/or to transmit pilot to the client UE. The network entity may receive at least one pilot measurement from the at least one relay UE for the client UE and may select a particular relay UE to serve as a relay station for the client UE. The network entity may also send directives to start and stop transmitting pilot to the at least one relay UE. The network entity may also control the operation of the at least one relay UE in other manners.

Various aspects and features of the disclosure are described in further detail below.

BRIEF DESCRIPTION OF THE DRAWINGS

FIGS. 5 and 6 show a process and an apparatus, respectively, for communication by a client UE.

FIGS. 7 and 8 show a process and an apparatus, respectively, for supporting communication by a relay UE.

FIGS. 9 and 10 show a process and an apparatus, respectively, for controlling relay operation by a network entity.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
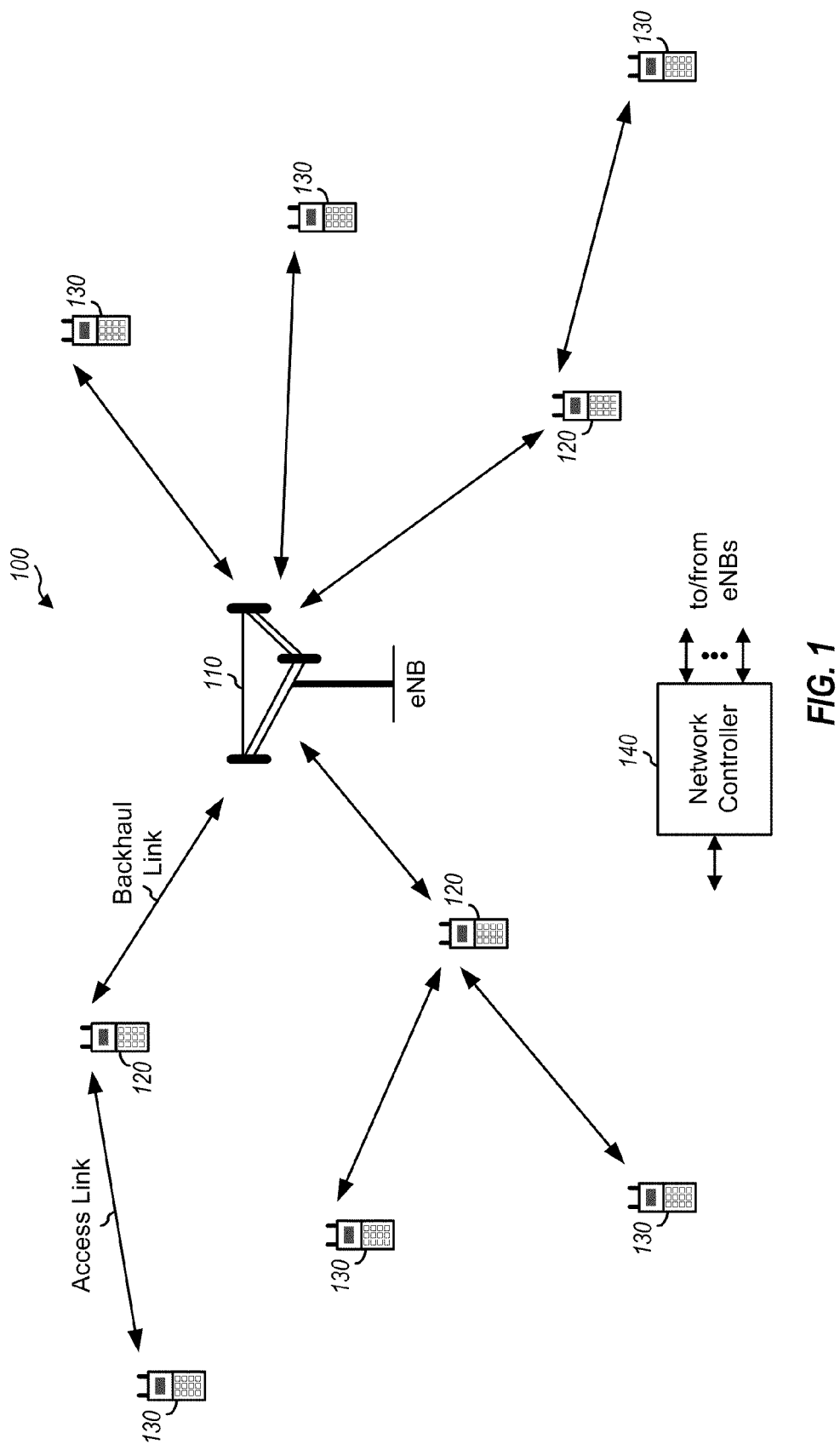
FIG. 1 shows a wireless communication network.

FIG. 1 shows a wireless communication network 100, which may be a wireless wide area network (WWAN). Network 100 may be a cellular network such as an LTE network or some other WWAN. Network 100 may include a number of evolved Node Bs (eNBs) and other network entities that can support communication for a number of UEs. For simplicity, only one eNB 110 and one network controller 140 are shown in FIG. 1. An eNB may be a station that communicates with the UEs and may also be referred to as a base station, a Node B, an access point, etc. An eNB may provide communication coverage for a particular geographic area. In 3GPP, the term "cell" can refer to a coverage area of an eNB and/or an eNB subsystem serving this coverage area, depending on the context in which the term is used. An eNB may support one or multiple (e.g., three) cells.

Relay stations 120 may be dispersed throughout network 100 and may facilitate communication between UEs and eNBs. A relay station is a station that receives a transmission of data and/or other information from an upstream station (e.g., an eNB or a UE) and sends a transmission of the data and/or other information to a downstream station (e.g., a UE or an eNB). A relay station may be a station that is dedicated to relaying transmissions for UEs. A relay station may also be a UE that relays transmissions for other UEs. A relay station may also be referred to as a relay, a relay UE, a relay eNB, etc. A relay station may communicate with a UE via an access link and may communicate with an eNB via a backhaul link in order to facilitate communication between the UE and the eNB.

UEs 130 may be dispersed throughout network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may communicate with eNBs and/or relay stations in a WWAN. A UE may also communicate with access points in a wireless local area network (WLAN), which may utilize IEEE 802.11 (Wi-Fi) or some other radio technology. A UE may also communicate with other devices in a wireless personal area network (WPAN), which may utilize Bluetooth or some other radio technology.

Network controller 140 may couple to a set of eNBs and may provide coordination and control for these eNBs. Network controller 140 may comprise a Radio Network Controller (RNC), a Mobile Switching Center (MSC), a Mobility Management Entity (MME), a Serving Gateway (SGW), a Packet Data Network (PDN) Gateway (PGW), and/or some other network entity.

As shown in FIG. 1, network 100 may support relay operation. For relay operation, a UE may communicate with an eNB via a relay station. Relay operation may enable a UE with poor channel conditions for its eNB to nevertheless communicate with the eNB via a relay station.

Network 100 may also support peer-to-peer (P2P) communication between UEs. For P2P communication, two UEs may communicate directly with each other without communicating with an eNB in a WWAN. P2P communication may reduce the load on the WWAN for local communications between the UEs. P2P communication between two UEs may also allow one UE to act as a relay station for the other UE, thereby enabling the other UE to connect to an eNB. UEs may thus operate as relay stations using their P2P capability.

To facilitate relay operation, all relay stations capable of relaying transmissions for UEs may transmit pilots that may allow UEs to discover these relay stations. A pilot is a signal or transmission that is known a priori by both a transmitting station and a receiving station. A pilot may also be referred to as a reference signal, a synchronization signal, a preamble, etc. A pilot used for discovery of a relay station may be referred to as a discovery pilot. Transmission of discovery pilots all the time by all relay stations may reduce battery life of these relay stations and may be especially undesirable when there are no UEs interested in communicating with these relay stations. Furthermore, continual transmission of discovery pilots by all relay stations may increase interference and hence consume a larger fraction of bandwidth for such pilot transmissions.

In an aspect, centralized control of relay operation may be supported to improve performance. A designated network entity may control the operation of relay stations within its coverage area. This coverage area may be a cell, a cluster of cells, etc. In one design, the network entity may be an eNB that can control the operation of relay stations within its coverage. In another design, the network entity may be a network controller such as an MME that can control the operation of relay stations in a cluster of cells. For clarity, much of the description below is for the design in which an eNB is the designated network entity. Centralized control of relay operation may be achieved in various manners.

In a first design of centralized control of relay operation, an eNB may select a set of UEs to act as relay stations for other UEs. A number of UEs may be capable of acting as relay stations. However, it may be undesirable to ask all of these UEs to transmit discovery pilots for the reasons noted above. A limited number of UEs may be selected to act as relay stations for other UEs. Only the selected UEs may transmit discovery pilots. The selection of UEs to act as relay stations may be based on various criteria.

In one design, the eNB may select a set of UEs with good channel conditions for the eNB to act as relay stations. Channel conditions may be quantified by geometry, signal-to-noise ratio (SNR), and/or other metrics. Good channel conditions may be quantified by geometry or SNR exceeding a threshold and/or based on other criteria. UEs with good channel conditions may be able to provide good backhaul link to the eNB for other UEs.

In another design, the eNB may select a set of UEs that are separated from each other geographically or in terms of radio pathloss to act as relay stations. This may allow the selected UEs to provide good relay coverage while minimizing the number of relay UEs in a given geographic area. The eNB may identify UEs that are separated geographically based on the locations of these UEs. The UE locations may be determined based on positioning, e.g., via Global Positioning System (GPS) or some other global navigation satellite system (GNSS). The eNB may also identify UEs that are separated in terms of radio pathloss based on pilot strength measurements, which may include eNB to UE pilot strength measurements, UE to UE pilot strength measurements, etc.

In yet another design, the eNB may select a set of UEs with good power supply capability to act as relay stations. These UEs may include UEs with high battery levels (e.g., exceeding a particular threshold) and/or UEs that are plugged into a fixed power source. UEs with good power supply capability may report this capability to the eNB. The eNB may then select all or a subset of the UEs with good power supply capability to act as relay stations.

In yet another design, the eNB may select UEs to act as relay stations based on fairness considerations. For example, the eNB may select UEs such that no more than a particular amount of battery power is consumed by any UE acting as a relay station. As another example, the eNB may select UEs that have benefited from relay stations in the past to later act as relay stations for other UEs. The eNB may also select UEs based on other fairness considerations.

The eNB may select UEs to act as relay stations based on any one of the criteria described above or some other criteria. The eNB may also select UEs to act as relay stations based on a combination of criteria. For example, the eNB may select UEs that have good power supply capability and are spaced apart geographically or in terms of radio pathloss. Alternatively or additionally, the eNB may select these UEs based on channel conditions, fairness, etc.

The UEs selected to act as relay stations may be referred to as relay UEs. In one design, the relay UEs may periodically transmit discovery pilots to allow client UEs to detect these relay UEs. To conserve battery power, the relay UEs may transmit their discovery pilots at a low duty cycle, which may be selected based on a tradeoff between power saving and relay detection speed. In another design, the eNB may activate UEs to act as relay stations depending on their proximity to a client UE that desires to be served. This design may avoid pilot transmission by relay UEs when there are no client UEs to be served by these relay UEs. For both designs, a relay UE that is selected to serve a client UE may transmit other pilots for communication between these UEs.

In a second design of centralized control of relay operation, a client UE desiring to communicate with an eNB may transmit a discovery pilot to allow relay UEs to detect the client UE. The relay UEs may be selected based on their proximity to the client UE and/or one or more of the criteria described above. Information for the client UE may be sent via broadcast or multicast to the relay UEs. One of the relay UEs may be selected to serve the client UE.

Figure 2:
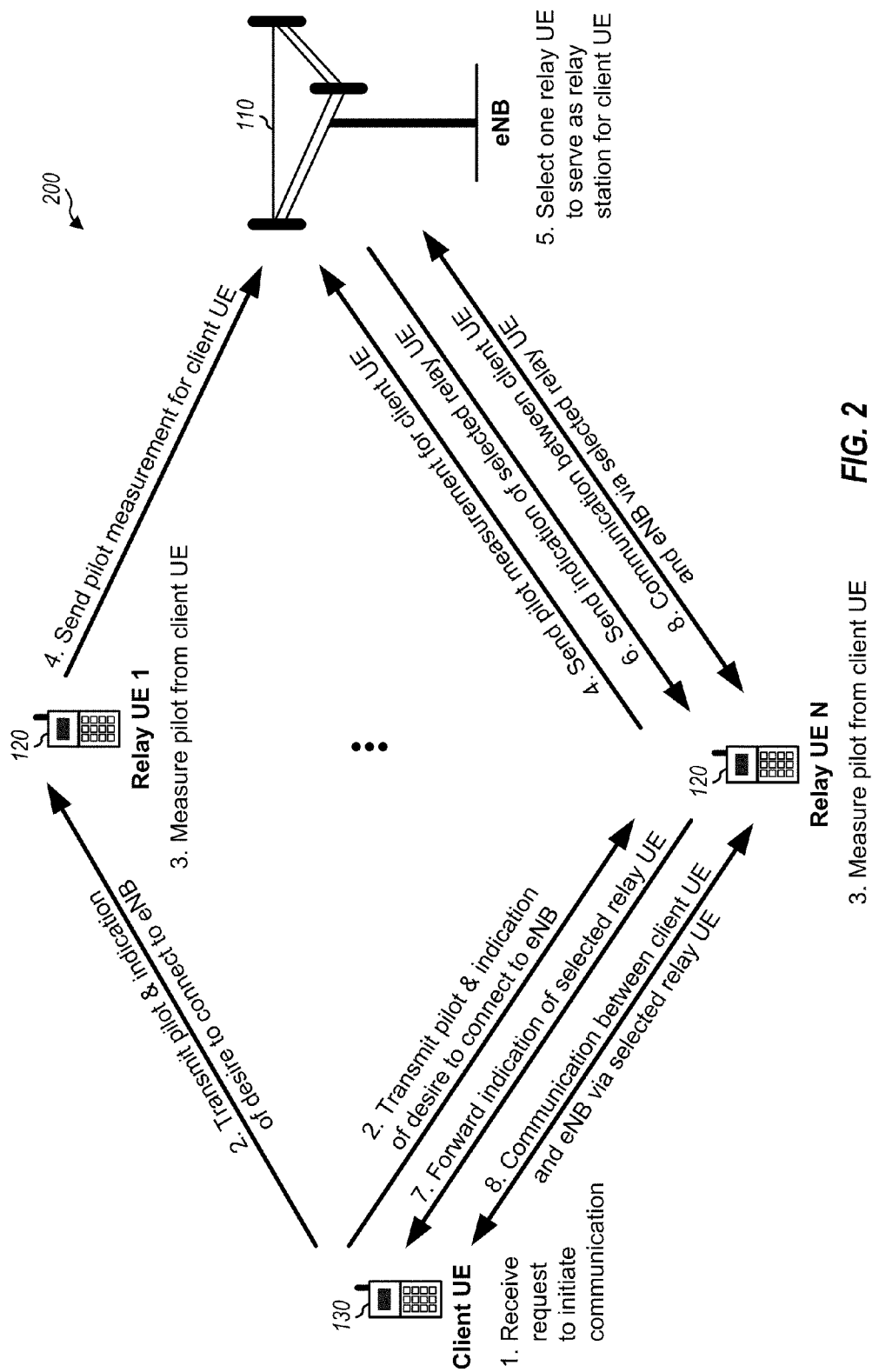
FIGS. 2 and 3 show two designs of centralized control of relay operation.

FIG. 2 shows a design of a pilot transmission and relay selection scheme 200 in accordance with the second design of centralized control of relay operation. A client UE may desire to communicate with an eNB but may be outside of the eNB coverage (step 1). Step 1 may occur due to a user initiating a call or based on some other action. The client UE may transmit a pilot and may also transmit an indication (e.g., a bit) to convey that it desires to communicate with an eNB (step 2). The pilot may be a demodulation reference signal or a sounding reference signal sent on the uplink in LTE for WWAN communication. The pilot may also be a discovery pilot that can indicate that the UE desires to communicate with an eNB.

Relay UEs within the vicinity of the client UE may detect the pilot from the client UE and may determine that the client UE requests assistance of a relay station to reach an eNB. The relay UEs may be selected specifically for the client UE, e.g., based on one or more of the criteria described above. Alternatively, the relay UEs may be selected to serve any client UE within their coverage. In any case, each relay UE may measure the pilot from the client UE and may determine the pathloss from the client UE to that relay UE based on the pilot measurement (step 3). The pathloss may be determined based on the known transmit power level and the measured received power level of the pilot from the client UE.

In a first relay selection design that is shown in FIG. 2, the relay UEs may send information for the client UE to the eNB (step 4). The information sent by each relay UE may include the identity of the client UE, the client UE's desire to communicate with an eNB, and pilot measurement (e.g., pathloss) for the client UE. For example, a relay UE may report information for the client UE only if the received pilot strength for the client UE is above a pilot strength threshold, or only if the pathloss for the client UE is less than a pathloss threshold, or based on some other criteria. The eNB may receive the information (e.g., the pilot measurements for the client UE) from all relay UEs that can serve the client UE. The eNB may select one of the relay UEs to serve as a relay station for the client UE (step 5). The eNB may then send an indication of the selected relay UE chosen to serve as a relay station for the client UE (step 6). The eNB and/or the selected relay UE may also send the indication to the client UE (step 7). The client UE may thereafter communicate with the eNB via the selected relay UE (step 8).

FIG. 2 shows the relay UEs sending pilot measurements for the client UE to the eNB to assist the eNB select a relay station for the client UE. The relay UEs may also send other information that may be used for relay selection. For example, the relay UEs may send their locations and/or the location of the client UE to the eNB.

In a second relay selection design that is not shown in FIG. 2, one of the relay UEs may independently decide to act as a relay station for the client UE. This decision may be made based on various types of information such as the pathloss between the relay UE and the client UE, the pathloss between the client UE and the eNB (which may be estimated by the relay UE based on received signal strengths), the loading of the eNB (which may be provided by the eNB to the relay UEs), etc. The relay UE may inform the eNB and/or the client UE of its decision to serve as a relay station for the client UE.

For both relay selection designs described above, the client UE may stop transmitting its pilot and indication of the desire to connect to an eNB after a relay UE has been selected to serve the client UE. The unselected relay UEs may stop measuring and reporting pilot measurements for the client UE.

The design shown in FIG. 2 may be used for a client UE requesting communication with an eNB. This design may also be used for handover of a client UE that is moving out of the coverage of an eNB or a relay station. If the eNB does not know the presence of the client UE (e.g., due to the client UE initiating communication), then the relay UEs may continually detect for client UEs desiring to connect to eNBs. To reduce power consumption by the relay UEs, the client UE may transmit its pilot and indication in designated time intervals, and the relay UEs may wake up and detect for the pilot and indication during the designated time intervals. If the eNB knows the presence of the client UE, then the eNB may ask the relay UEs to detect and measure the pilot from the client UE. The eNB may convey pertinent information (e.g., a reference signal sequence) for the pilot from the client UE to the relay UEs. The relay UEs may detect for the pilot from the client UE based on the information from the eNB.

In a third design of centralized control of relay operation, a set of relay UEs may be selected for a client UE, e.g., based on their proximity to the client UE and/or one or more of the criteria described above. The relay UEs may transmit discovery pilots to allow the client UE to detect these relay UEs. One of the relay UEs may be selected to serve the client UE.

Figure 3:
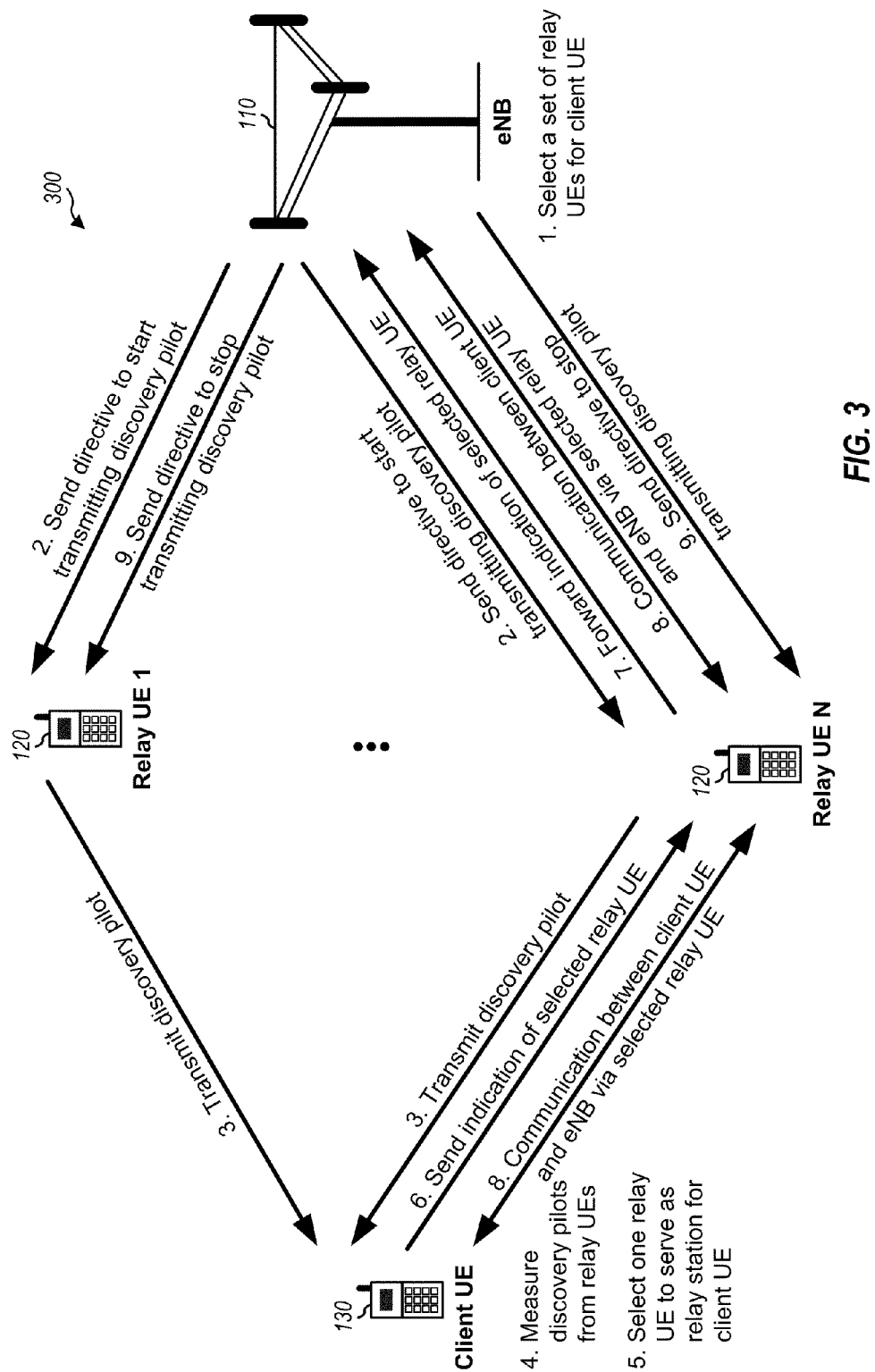

FIG. 3 shows a design of a pilot transmission and relay selection scheme 300 in accordance with the third design of centralized control of relay operation. An eNB may select a set of relay UEs for a client UE, e.g., based on the locations of the relay UEs, the pathloss from the relay UEs to the eNB, the pathloss from the eNB to the client UE, and/or other criteria (step 1). The eNB may send a directive to the relay UEs to start transmitting discovery pilots (step 2). The relay UEs may receive the directive from the eNB and may start transmitting the discovery pilots (step 3). In one design, the relay UEs may transmit discovery pilots that may resemble pilots from eNBs. For this design, the client UE may be a legacy UE that may be unaware of the relay UEs being UEs and not eNBs. In another design, the relay UEs may transmit discovery pilots that are designed specially for relay detection.

The client UE may measure the discovery pilots from the relay UEs (step 4) and may select one relay UE to serve as a relay station for the client UE (step 5). The client UE may send an indication of the selected relay UE chosen to serve as a relay station for the client UE (step 6). The client UE and/or the selected relay UE may also send the indication to the eNB (step 7). The client UE may thereafter communicate with the eNB via the selected relay UE (step 8). The eNB may send a directive to the relay UEs to stop transmitting discovery pilots in order to save battery power (step 9).

The design shown in FIG. 3 may be used for a client UE requesting communication with an eNB. If the eNB does not know the presence of the client UE, then the relay UEs may continually transmit discovery pilots to allow the client UE to detect the relay UEs. If the eNB knows the presence of the client UE (e.g., via an access probe sent by the client UE), then the eNB may ask the relay UEs to transmit discovery pilots to allow the client UE to detect the relay UEs. The eNB may also ask the relay UEs to stop transmitting the discovery pilots after a relay UE has been selected for the client UE.

The design shown in FIG. 3 may also be used for handover of a client UE that is moving out of the coverage of an eNB or a relay station. In this case, the eNB would know the presence of the client UE and may ask the relay UEs to transmit discovery pilots, e.g., when a decision is made to perform handover. The client UE may communicate with the eNB prior to the handover decision, select one relay UE as a relay station when the handover decision is made, and perform handover to the selected relay UE.

FIGS. 2 and 3 show two exemplary designs of centralized control of discovery pilot transmission and/or reception. In these designs, an eNB may instruct a set of relay UEs to receive discovery pilots from a client UE (in FIG. 2) or to transmit discovery pilots to a client UE (in FIG. 3). Centralized control of discovery pilot transmission and/or reception may also be performed in other manners. For example, a client UE as well as the relay UEs may transmit discovery pilots to enable mutual detection of these UEs.

In another design, a relay UE may be selected for a client UE based on geographic or radio proximity between these UEs. For example, an eNB may receive an indication of the client UE desiring to communicate with the eNB and may obtain the location of the client UE. The eNB may select a relay UE that is closest to the client UE to act as a relay station for the client UE. The eNB may then send notification of the selection to the relay UE and/or the client UE. For this design, either the client UE or the relay UE, or both UEs, or neither UE may transmit discovery pilot.

In general, the same or different radio technologies may be used for discovery pilot transmission, relay communication between UEs, and WWAN communication between UEs and eNBs. A client UE and a relay UE may communicate using the same radio technology used by the WWAN (e.g., LTE-A) or a different radio technology (e.g., FlashLinQ, which is designed especially for P2P communication). Discovery pilots may be transmitted using the same radio technology used for relay communication or WWAN communication or a different radio technology.

In general, the same or different frequency channels/spectrum may be used for discovery pilot transmission, relay communication, and WWAN communication. A client UE and a relay UE may communicate on the same frequency channel used for WWAN communication. In this case, some resources may be reserved for relay communication between the client UE and the relay UE. The client UE and the relay UE may also communicate on a different frequency channel not used for WWAN communication. Discovery pilot may be transmitted on the same frequency channel used for relay communication or WWAN communication or on a different frequency channel.

A discovery pilot used for relay detection may be defined in various manners. In one design, a discovery pilot may be different (e.g., in structure) from pilots and reference signals normally sent on the downlink and uplink in the WWAN. A relay UE may transmit a discovery pilot to allow client UEs to detect the relay UE. A client UE may be able to distinguish the relay UE as a relay station, instead of an eNB or a normal UE, based on the structure of the discovery pilot.

In another design, a discovery pilot may be a legacy compatible pilot that is sent on the downlink by an eNB or on the uplink by a UE for WWAN communication. For the downlink in LTE, a discovery pilot may comprise a primary synchronization signal, a secondary synchronization signal, a cell-specific reference signal, a positioning reference signal, a UE-specific reference signal, and/or other signals or transmissions sent by an eNB for WWAN communication. For the uplink in LTE, a discovery pilot may comprise a sounding reference signal, a demodulation reference signal, and/or other signals or transmissions sent by a UE for WWAN communication. A transmitting UE may generate a discovery pilot based on one or more identities (IDs) and/or other parameters assigned to the UE and may transmit the discovery pilot. A receiving UE may be able to distinguish the transmitting UE as a relay station instead of an eNB or a normal UE based on the discovery pilot, e.g., based on the identities and/or parameters used to generate the discovery pilot.

In one design, a discovery pilot for a relay or client UE may be static and may not change over time. In another design, a discovery pilot for a relay or client UE may be time varying and may change over time. This design may be used to accommodate a large number of relay UEs and/or client UEs. A discovery pilot may be varied by changing a sequence used to generate the pilot and/or by changing time-frequency resources used to send the pilot.

Figure 4:
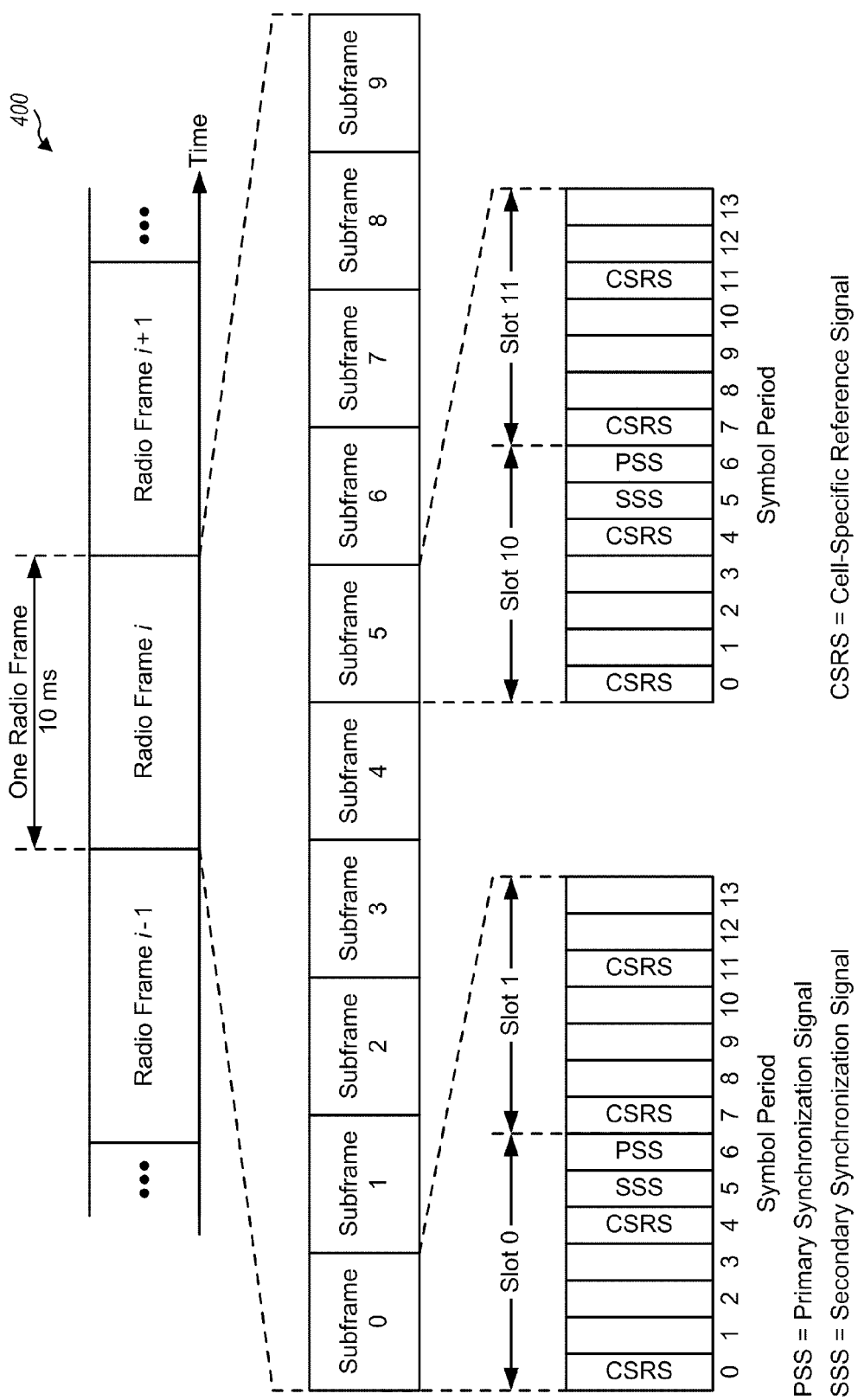
FIG. 4 shows an exemplary frame structure.

FIG. 4 shows an exemplary frame structure 400 used for the downlink in LTE. The transmission timeline for the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices 0 through 19. Each slot may include L symbol periods, e.g., seven symbol periods for a normal cyclic prefix (as shown in FIG. 4) or six symbol periods for an extended cyclic prefix. The 2L symbol periods in each subframe may be assigned indices of 0 through 2L−1.

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

The time-frequency resources available for the downlink and uplink may be partitioned into resource blocks. Each resource block may cover 12 subcarriers in one slot and may include a number of resource elements. Each resource element may cover one subcarrier in one symbol period and may be used to send one modulation symbol, which may be a real or complex value. On the downlink, an OFDM symbol may be sent in each symbol period of a subframe. On the uplink, an SC-FDMA symbol may be sent in each symbol period of a subframe. An OFDM symbol or an SC-FDMA symbol may include non-zero values for resource elements used for transmission and zero values for resource elements not used for transmission.

FIG. 4 also shows exemplary transmissions of primary and secondary synchronization signals and a cell-specific reference signal for one cell in LTE. The primary synchronization signal (PSS) and the secondary synchronization signal (SSS) may be sent in symbol periods 6 and 5, respectively, of each of slots 0 and 10 of each radio frame. The cell-specific reference signal (CSRS) may be sent (i) in symbol periods 0 and 4 of each slot for an eNB equipped with two antennas, as shown in FIG. 4, or (ii) in symbol periods 0, 1 and 4 of each slot for an eNB equipped with four antennas.

A primary synchronization signal for a cell may be generated based on a sample sequence, which may be generated based on a cell ID of the cell. A secondary synchronization signal for the cell may be generated based on a set of pseudo-random sequences and scrambling sequences, which may be generated based on the cell ID. The primary and secondary synchronization signals may each be sent on 62 resource elements corresponding to the center 930 KHz of the system bandwidth. A cell-specific reference signal for the cell may be generated based on a pseudo-random sequence, which may be initialized based on the cell ID. The reference signal sequence may be mapped to a set of resource elements that may be selected based on the cell ID In one design, a discovery pilot may comprise the primary and secondary synchronization signals sent on the downlink. A relay UE may be assigned a cell ID used to identify the relay UE. This cell ID may be selected to be different from cell IDs assigned to nearby cells in order to avoid collision. This cell ID may also be time varying to mitigate collision with the cell IDs of nearby cells. In any case, the relay UE may generate the primary and secondary synchronization signals based on its assigned cell ID and may transmit the synchronization signals in similar manner as an eNB. A client UE may detect and measure the synchronization signals from the relay UE in similar manner as the synchronization signals from an eNB. The use of the synchronization signals for the discovery pilot may support relay communication for legacy UEs, which may operate as normal UEs for relay communication. However, coverage hole may be created in a single carrier deployment due to transmission of the synchronization signals for relay detection. An eNB may monitor pilot measurements to ensure that there are no outages due to transmission of the synchronization signals for relay detection.

In another design, a discovery pilot may comprise a cell-specific reference signal sent on the downlink. A relay UE may be assigned a cell ID used to identify the relay UE. The relay UE may generate the cell-specific reference signal based on the assigned cell ID and may transmit the cell-specific reference signal in similar manner as an eNB. A client UE may detect and measure the cell-specific reference signal from the relay UE in similar manner as a cell-specific reference signal from an eNB.

In yet another design, a discovery pilot may comprise a positioning reference signal sent on the downlink. The positioning reference signal may also be referred to as a low reuse preamble (LRP) and may be transmitted with low reuse so that it can be detected even by UEs observing high interference. Some time-frequency resources may be reserved for transmitting positioning reference signals. A relay UE may transmit a positioning reference signal on some of the reserved time-frequency resources.

In yet another design, a discovery pilot may comprise a UE-specific reference signal sent on the downlink. The UE-specific reference signal may be generated based on a pseudo-random sequence. For WWAN communication, the pseudo-random sequence may be initialized based on a cell ID of a transmitting cell and a UE ID of a recipient UE. For relay detection, the pseudo-random sequence may be initialized based on a cell ID assigned to a relay UE and/or a UE ID assigned to a client UE.

In yet another design, a discovery pilot may comprise a sounding reference signal sent on the uplink. The sounding reference signal may be generated based on a sounding reference signal sequence, which may be generated based on a cyclic shift of a base sequence. For WWAN communication, the cyclic shift may be configured for a UE. For relay detection, the cyclic shift may be configured for a relay UE. The relay UE may also be assigned a set of resource elements and a set of subframes in which to send the sounding reference signal. The relay UE may generate the sounding reference signal sequence based on its assigned parameters and may map this sequence to a set of resource elements in each SC-FDMA symbol carrying the sounding reference signal.

In yet another design, a discovery pilot may comprise a demodulation reference signal sent on the uplink. The demodulation reference signal may be generated based on a cyclic shift of a base sequence. For WWAN communication, the cyclic shift may be configured for a UE. For relay detection, the cyclic shift may be configured for a relay UE. The demodulation reference signal may be sent on one or more resource blocks assigned for transmission.

The synchronization signals and reference signals described above may be generated and transmitted as described in 3GPP TS 36.211, entitled "Evolved Universal Terrestrial Radio Access (E-UTRA); Physical Channels and Modulation (Release 8)," which is publicly available.

In another design, a discovery pilot may comprise a transmission sent on a physical random access channel (PRACH), a physical downlink control channel (PDCCH), a physical downlink shared channel (PDSCH), or some other physical channel for the downlink. In yet another design, a discovery pilot may comprise a transmission sent on a physical uplink control channel (PUCCH), a physical uplink shared channel (PUSCH), or some other physical channel for the uplink.

In general, a discovery pilot may comprise one or more synchronization signals and/or one or more reference signals that may be used for detection of a relay station. A discovery pilot may also comprise a pilot that may be defined and transmitted especially for relay detection. A discovery pilot may also comprise one or more transmissions sent on one or more physical channels. A discovery pilot may be transmitted in one or more unused resource blocks on the downlink or uplink, on time-frequency resources reserved for transmitting the discovery pilot, in multicast/broadcast single frequency network (MBSFN) subframes, etc. MBSFN subframes are subframes normally used to send multicast and/or broadcast data to multiple UEs. An MBSFN subframe may have a cell-specific reference signal sent in fewer symbol periods, which may allow more of the subframe to be used for other transmissions.

Different types of discovery pilots may have different ranges. For example, synchronization signals may have greater range than reference signals. The range of a discovery pilot may also depend on whether the network is (i) a synchronous network with all eNBs having similar frame timing or (ii) an asynchronous network with the eNBs having independent frame timing. Certain types of discovery pilots, such as low reuse preambles, may not be available in an asynchronous network since interference from other transmissions in the network may overwhelm the discovery pilots.

In one design, a relay UE may slowly ramp up the transmit power of a discovery pilot in order to mitigate disruption to nearby UEs. This slow ramp up may prevent outage of client UEs as well as other UEs in the vicinity of the relay UE. The slow ramp up may be especially applicable if the discovery pilot comprises the primary and secondary synchronization signals sent on the downlink or the sounding reference signal sent on the uplink.

For clarity, much of the description above is for transmission of different types of discovery pilots by relay UEs. Client UEs may also transmit these different types of discovery pilots in similar manner.

For all designs described above, an eNB may send configuration information for a discovery pilot to a relay UE and/or a client UE. The configuration information may convey pertinent parameters for the discovery pilot. These parameters may include parameters used to generate the discovery pilot (e.g., cell ID, cyclic shift, code, etc.), parameters for resources used to transmit the discovery pilot, etc. A transmitting UE may generate and transmit the discovery pilot in accordance with the configuration information. A receiving UE may detect for the discovery pilot based on the configuration information, if available. The receiving UE may also detect for the discovery pilot based on all possible parameter values if the configuration information is not available.

The techniques described herein may enable client UEs to obtain service from eNBs and may thus provide coverage extension for the client UEs. The techniques may be used for a single relay hop, i.e., for communication between a client UE and an eNB via a single relay station. The techniques may also be used for multiple relay hops, i.e., for communication between a client UE and an eNB via multiple relay stations.

FIG. 5 shows a design of a process 500 for communicating via a relay station. Process 500 may be performed by a first UE, which may be a client UE, as described below, or by some other entity. The first UE may exchange pilot with at least one UE capable of serving as relay station (block 512). The first UE may obtain an indication that a second UE will serve as a relay station for the first UE, with the second UE being one of the at least one UE (block 514). The first UE may exchange data with a base station via the second UE (block 516). The first and second UEs may communicate peer-to-peer. Peer-to-peer communication between the first UE and the second UE may occur on frequency spectrum not used for WWAN communication, or on frequency spectrum used for WWAN communication, or on frequency spectrum used for the uplink for WWAN communication. The first and second UEs may transmit using TDD (e.g., on the uplink frequency spectrum) or FDD for peer-to-peer communication.

In one design of block 512, the first UE may transmit pilot to the at least one UE to enable the at least one UE to detect the first UE, e.g., as shown in FIG. 2. The first UE may also transmit an indication that the first UE desires to communicate with the base station but is outside of the coverage of the base station. For block 514, the first UE may receive the indication that the second UE will serve as a relay station for the first UE. The second UE may be selected (i) by the base station based on at least one pilot measurement made by the at least one UE for the first UE or (ii) by the second UE based on a pilot measurement made by the second UE for the first UE.

In another design of block 512, the first UE may receive pilot transmitted by the at least one UE to enable detection of the at least one UE, e.g., as shown in FIG. 3. For block 514, the first UE may measure the pilot transmitted by each of the at least one UE and may select the second UE from among the at least one UE based on at least one pilot measurement for the at least one UE.

For both designs of block 512, the pilot may comprise at least one synchronization signal, or at least one reference signal, or at least one transmission sent on at least one physical channel for relay detection, or a combination thereof.

FIG. 6 shows a design of an apparatus 600 for communicating via a relay station. Apparatus 600 includes a module 612 to exchange pilot between a first UE and at least one UE capable of serving as relay station, a module 614 to obtain an indication that a second UE will serve as a relay station for the first UE, with the second UE being one of the at least one UE, and a module 616 to exchange data between the first UE and a base station via the second UE.

FIG. 7 shows a design of a process 700 for supporting communication between a first UE and a base station. Process 700 may be performed by a second UE, which may be a relay UE, as described below, or by some other entity. The second UE may be capable of serving as a relay station for the first UE and may exchange pilot with the first UE (block 712). The second UE may obtain an indication for it to serve as a relay station for the first UE (block 714). The second UE may then relay data exchanged between the first UE and the base station (block 716).

In one design of block 712, the second UE may receive pilot transmitted by the first UE to enable detection of the first UE, e.g., as shown in FIG. 2. In one design of block 714, the second UE may measure the pilot transmitted by the first UE, send a pilot measurement for the first UE to the base station, and receive the indication from the base station, e.g., as shown in FIG. 2. In another design of block 714, the second UE may measure the pilot transmitted by the first UE and may make a decision to serve as a relay station for the first UE based on the pilot measurement for the first UE.

In another design of block 712, the second UE may transmit pilot to enable the first UE to detect the second UE, e.g., as shown in FIG. 3. The second UE may receive a directive to start transmitting pilot from the base station and may transmit the pilot in response to the directive. The second UE may also receive a directive to stop transmitting pilot from the base station and may stop transmitting the pilot in response to this directive. For block 714, the second UE may receive the indication from the first UE, e.g., as shown in FIG. 3, or from another entity.

The second UE may be one of a set of relay UEs selected a priori by the base station to act as relay stations for client UEs. The second UE may also be one of at least one relay UE selected specifically by the base station for the first UE. The second UE may transmit or receive the pilot based on a low duty cycle, which may be selected to reduce power consumption by the second UE.

FIG. 8 shows a design of an apparatus 800 for supporting communication. Apparatus 800 includes a module 812 to exchange pilot with a first UE by a second UE capable of serving as a relay station for the first UE, a module 814 to obtain an indication for the second UE to serve as a relay station for the first UE, and a module 816 to relay, by the second UE, data exchanged between the first UE and a base station.

FIG. 9 shows a design of a process 900 for supporting communication. Process 900 may be performed by a network entity. The network entity may identify at least one UE capable of serving as relay station (block 912). The network entity may select the at least one UE to serve as relay station for UEs within a given coverage area or for a specific UE desiring to communicate with a base station. The network entity may select the at least one UE to serve as relay station based on channel conditions between the at least one UE and a base station, or geographic location of the at least one UE, or geographic location of client UEs, or power supply level of the at least one UE, or fairness considerations, or some other considerations, or a combination thereof.

The network entity may control operation of the at least one UE to support communication between one or more UEs and a base station (block 914). The network entity may identify a first UE desiring to communicate with the base station, with the first UE being one of the one or more UEs (block 916). The network entity may also identify a second UE selected to serve as a relay station for the first UE, with the second UE being one of the at least one UE (block 918). The network entity may exchange data with the first UE via the second UE (block 920).

In one design, the network entity may identify the first UE desiring to communicate with the base station. The network entity may then direct the at least one UE to detect for pilot from the first UE (e.g., as shown in FIG. 2) and/or to transmit pilot to the first UE (e.g., as shown in FIG. 3). In another design, the at least one UE may periodically detect for pilot from and/or transmit pilot to any UE desiring to communicate with the base station but may be outside of the base station coverage.

In one design of block 914, the network entity may receive at least one pilot measurement for pilot exchanged between the first UE and the at least one UE, e.g., as shown in FIG. 2. The network entity may select the second UE to serve as a relay station for the first UE. The network entity may then send an indication of the second UE being selected to serve as a relay station for the first UE.

In another design of block 914, the network entity may send a directive to start transmitting pilot to the at least one UE, which may start transmitting pilot in response to the directive, e.g., as shown in FIG. 3. After the second UE has been selected to serve as a relay station for the first UE, the network entity may send a second directive to stop transmitting pilot to the at least one UE, which may stop transmitting pilot in response to the second directive.

In one design, the network entity may be a base station that can control the operation of relay UEs within its coverage. In another design, the network entity may be a network controller that can control operation of relay UEs within a cluster of cells.

FIG. 10 shows a design of an apparatus 1000 for supporting communication. Apparatus 1000 includes a module 1012 to identify at least one UE capable of serving as relay station and a module 1014 to control operation of the at least one UE to support communication between one or more UEs and a base station. Apparatus 1000 may further include a module 1016 to identify a first UE desiring to communicate with the base station, with the first UE being one of the one or more UEs, a module 1018 to identify a second UE selected to serve as a relay station for the first UE, with the second UE being one of the at least one UE, and a module 1020 to exchange data with the first UE via the second UE.

The modules in FIGS. 6, 8 and 10 may comprise processors, electronic devices, hardware devices, electronic components, logical circuits, memories, software codes, firmware codes, etc., or any combination thereof.

For clarity, much of the description above refers to relay communication and WWAN communication. In general, the techniques described herein may be applicable for relay communication and (i) WWAN communication between stations and base stations/eNBs, (ii) WLAN communication between stations and access points (e.g., using Wi-Fi), and (iii) WPAN communication between stations and devices (e.g., using Bluetooth). Hence, references to WWAN communication in the description above may be replaced with WWAN communication, WLAN communication, and/or WPAN communication.

Figure 11:
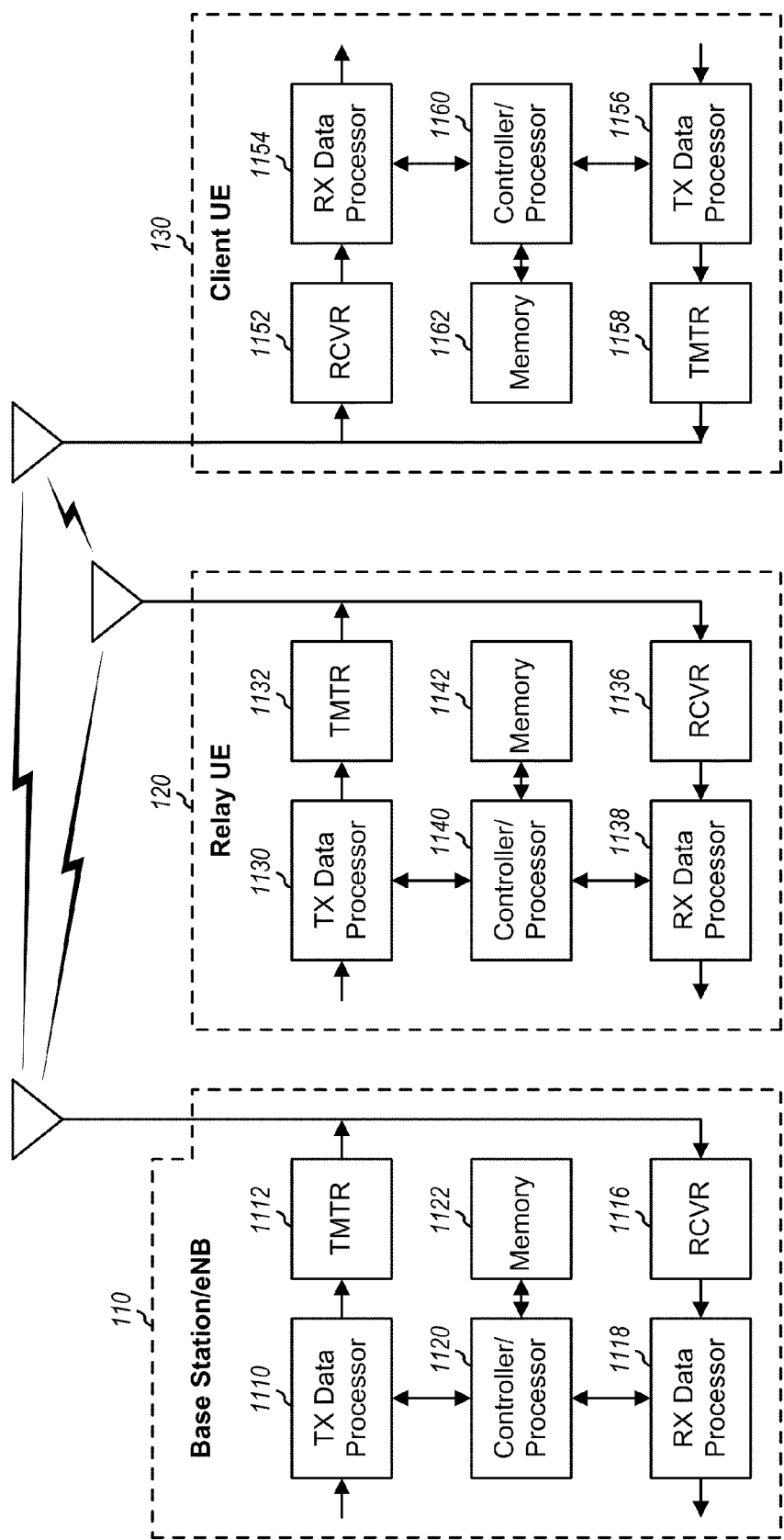
FIG. 11 shows a block diagram of a base station, a relay UE, and a client UE.

FIG. 11 shows a block diagram of a design of base station/eNB 110, relay UE 120, and client UE 130. At base station 110, a transmit (TX) data processor 1110 may receive data to send to UEs and may process (e.g., encode and modulate) the data for each UE in accordance with one or more modulation and coding schemes for that UE to obtain data symbols. Processor 1110 may also process control information to obtain control symbols, generate reference symbols for reference signals and synchronization signals, and multiplex the data symbols, the control symbols, and the reference symbols. Processor 1110 may further process the multiplexed symbols (e.g., for OFDM, etc.) to generate output samples. A transmitter (TMTR) 1112 may condition (e.g., convert to analog, amplify, filter, and upconvert) the output samples to generate a downlink signal, which may be transmitted to UEs 120 and 130.

At relay UE 120, the downlink signal from base station 110 may be received and provided to a receiver (RCVR) 1136. Receiver 1136 may condition (e.g., filter, amplify, downconvert, and digitize) the received signal and provide input samples. A receive (RX) data processor 1138 may process the input samples (e.g., for OFDM, etc.) to obtain received symbols. Processor 1138 may further process (e.g., demodulate and decode) the received symbols to recover data and control information sent to client UE 130. On the uplink, a TX data processor 1130 may process (e.g., encode and modulate) data and control information to be sent by relay UE 120 to obtain data symbols and control symbols. Processor 1130 may also generate reference symbols for synchronization signals and reference signals, multiplex the data and control symbols with the reference symbols, and process the multiplexed symbol (e.g., for SC-FDMA, etc.) to obtain output samples. A transmitter 1132 may condition the output samples and generate a backhaul signal, which may be transmitted to base station 110.

At base station 110, the backhaul signal from relay UE 120 may be received and conditioned by a receiver 1116, and processed by an RX data processor 1118 to recover the data and control information sent by relay UE 120. A controller/processor 1120 may control data transmission on the downlink and uplink.

Relay UE 120 may also communicate with client UE 130. On the access downlink, data, control information, discovery pilot, and reference signals may be processed by TX data processor 1130 and conditioned by transmitter 1132 to generate an access downlink signal, which may be transmitted to client UE 130. On the access uplink, an access uplink signal from client UE 130 may be received and conditioned by receiver 1136 and processed by RX data processor 1130 to recover data, control information, discovery pilot, and reference signals sent by client UE 130.

Client UE 130 includes a receiver 1152, a transmitter 1158, an RX data processor 1154, a TX data processor 1156, a controller/processor 1160, and a memory 1162 that may operate in similar manner as the corresponding units at relay UE 120. Controllers/processors 1120, 1140 and 1160 may control the operation at base station 110, relay UE 120, and client UE 130, respectively. Controller/processor 1160 and/or other processors or modules within client UE 130 may perform or direct process 500 in FIG. 5 and/or other processes for the techniques described herein. Controller/processor 1140 and/or other processors or modules within relay UE 120 may perform or direct process 700 in FIG. 7 and/or other processes for the techniques described herein. Controller/processor 1120 and/or other processors or modules within base station 110 may perform or direct process 900 in FIG. 9 and/or other processes for the techniques described herein. Controllers/processors 1120, 1140 and 1160 may also direct or perform processing for the eNB, one relay UE, and the client UE, respectively, in FIGS. 2 and 3. Memories 1122, 1142 and 1162 may store data and program codes for base station 110, relay UE 120, and client UE 130, respectively.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   transmitting, from a first user equipment (UE) to a second UE, a pilot indicating that the first UE outside a coverage area of a base station desires to communicate with the base station that currently serves the second UE, the pilot being used for at least a pilot measurement between the first UE and the second UE, and the pilot being used to detect the first UE;
   determining, at the first UE, that the second UE will serve as a relay station between the base station and the first UE based at least in part on the pilot measurement, and the base station being unaware of the first UE prior to receiving the pilot measurement from the second UE; and
   transmitting data, from the first UE to the second UE, for subsequent transmission to the base station.

2. The method of claim 1, wherein the determining comprises receiving, at the first UE, an indication that the second UE will serve as a relay station for the first UE.

3. The method of claim 1, wherein the data is transmitted from the first UE to the second UE after determining that the second UE will serve as the relay station.

4. The method of claim 1, wherein the pilot comprises at least a synchronization signal, a reference signal, a transmission sent on at least one physical channel, or a combination thereof.

5. An apparatus for wireless communication, comprising:
means for transmitting, from a first user equipment (UE) to a second UE, a pilot indicating that the first UE outside a coverage area of a base station desires to communicate with the base station that currently serves the second UE, the pilot being used for at least a pilot measurement between the first UE and the second UE, and the pilot being used to detect the first UE;
means for determining, at the first UE, that the second UE will serve as a relay station between the base station and the first UE based at least in part on the pilot measurement, and the base station being unaware of the first UE prior to receiving the pilot measurement from the second UE; and
means for transmitting data, from the first UE to the second UE, for subsequent transmission to the base station.

6. The apparatus of claim 5, wherein the means for determining comprises means for receiving, at the first UE, an indication that the second UE will serve as the relay station for the first UE.

7. A first user equipment (UE) for wireless communication, comprising:
at least one processor configured:
to transmit, to a second UE, a pilot indicating that the first UE outside a coverage area of a base station desires to communicate with the base station that currently serves the second UE, the pilot being used for at least a pilot measurement between the first UE and the second UE, and the pilot being used to detect the first UE;
to determine that the second UE will serve as a relay station between the base station and the first UE based at least in part on the pilot measurement, and the base station being unaware of the first UE prior to receiving the pilot measurement from the second UE, and
to transmit data, to the second UE, for subsequent transmission to the base station.

8. The first UE of claim 7, wherein the at least one processor is further configured to determine based on a received indication that the second UE will serve as the relay station for the first UE.

9. A non-transitory computer-readable medium encoded with program code, the program code comprising:
code to transmit, from a first user equipment (UE) to a second UE, a pilot indicating that the first UE outside a coverage area of a base station desires to communicate with the base station that currently serves the second UE, the pilot being used for at least a pilot measurement between the first UE and the second UE, and the pilot being used to detect the first UE;
code to determine, at the first UE, that the second UE will serve as a relay station between the base station and the first UE based at least in part on the pilot measurement, and the base station being unaware of the first UE prior to receiving the pilot measurement from the second UE, and
code to transmit data, from the first UE to the second UE, for subsequent transmission to the base station.

10. A method for wireless communication, comprising:
receiving, at a second user equipment (UE) from a first UE, a pilot indicating that the first UE outside a coverage area of a base station desires to communicate with the base station that currently serves the second UE, the pilot being used for at least a pilot measurement between the first UE and the second UE, and the pilot being used to detect the first UE;
determining, at the second UE, that the second UE is selected to serve as a relay station between the base station and the first UE based at least in part on the pilot measurement, and the base station being unaware of the first UE prior to receiving the pilot measurement from the second UE; and
relaying, by the second UE, data from the first UE to the base station.

11. The method of claim 10, wherein the determining comprises:
transmitting the pilot measurement to the base station, and
receiving, from the base station, an indication that the second UE is selected as the relay station.

12. The method of claim 10, further comprising transmitting, to the first UE, an indication that the second UE is selected as the relay station.

13. The method of claim 10, wherein the pilot is received on a low duty cycle.

14. An apparatus for wireless communication, comprising:
means for receiving, at a second user equipment (UE) from a first UE, a pilot indicating that the first UE outside a coverage area of a base station desires to communicate with the base station that currently serves the second UE, the pilot being used for at least a pilot measurement between the first UE and the second UE, and the pilot being used to detect the first UE;
means for determining, at the second UE, that the second UE is selected to serve as a relay station between the base station and the first UE based at least in part on the pilot measurement, and the base station being unaware of the first UE prior to receiving the pilot measurement from the second UE; and
means for relaying, by the second UE, data from the first UE to the base station.

15. The apparatus of claim 14, wherein the means for determining comprises:
means for transmitting the pilot measurement to the base station, and
means for receiving, from the base station, an indication that the second UE is selected as the relay station.

16. A method for wireless communication, comprising:
receiving a pilot measurement for a pilot transmitted from a second user equipment (UE) to a first UE, the pilot indicating that the second UE outside a coverage area of a base station desires to communicate with the base station that currently serves the first UE, the base station being unaware of the second UE prior to receiving the pilot measurement, and the pilot being used to detect the second UE;
determining that the first UE is capable of serving as a relay station between the second UE and the base station based on pre-determined criteria;
selecting the first UE to serve as the relay station for the second UE based at least in part on the pilot measurement; and
controlling the first UE to support communication between the second UE and the base station.

17. The method of claim 16, in which the pre-determined criteria comprises at least channel conditions between the first UE and the base station, a geographic location of the first UE, a geographic location of the second UE, a power supply level of the first UE, fairness considerations, or a combination thereof.

18. The method of claim 16, further comprising transmitting an indication that the first UE is selected as the relay station for the second UE.

19. The method of claim 16, further comprising:
transmitting data to the first UE so that the data is transmitted to the second UE.

20. An apparatus for wireless communication, comprising:
means for receiving a pilot measurement for a pilot transmitted from a second user equipment (UE) to a first UE, the pilot indicating that the second UE outside a coverage area of a base station desires to communicate with the base station that currently serves the first UE, the base station being unaware of the second UE prior to receiving the pilot measurement, and the pilot being used to detect the second UE;
means for determining that the first UE is capable of serving as a relay station between the second UE and the base station based on pre-determined criteria;
means for selecting the first UE to serve as the relay station for the second UE based at least in part on the pilot measurement; and
means for controlling the first UE to support communication between the second UE and the base station.

21. The apparatus of claim 20,
further comprising means for transmitting an indication that the first UE is selected as the relay station for the second UE.

22. The apparatus of claim 20, further comprising:
means for transmitting data to the first UE so that the data is transmitted to the second UE.

* * * * *